(12) United States Patent
L'Huillier et al.

(10) Patent No.: US 10,535,075 B1
(45) Date of Patent: Jan. 14, 2020

(54) REWARDS PROGRAM

(71) Applicant: Groupon, Inc., Chicago, IL (US)

(72) Inventors: Gaston L'Huillier, San Francisco, CA (US); Michael Mac-Vicar, Mountain View, CA (US); Cristian Sepulveda, San Francisco, CA (US); Francisco Larrain, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 695 days.

(21) Appl. No.: 15/160,142

(22) Filed: May 20, 2016

Related U.S. Application Data

(63) Continuation of application No. 13/796,695, filed on Mar. 12, 2013, now abandoned.

(60) Provisional application No. 61/623,472, filed on Apr. 12, 2012.

(51) Int. Cl.
  *G06Q 30/02* (2012.01)
  *G06Q 20/34* (2012.01)
  *G06F 16/951* (2019.01)

(52) U.S. Cl.
  CPC ....... *G06Q 30/0229* (2013.01); *G06F 16/951* (2019.01); *G06Q 20/34* (2013.01)

(58) Field of Classification Search
  CPC .................................................. G06Q 30/0229
  USPC ..................................................... 705/14.27
  See application file for complete search history.

(56) References Cited

U.S. PATENT DOCUMENTS

| 7,933,841 B2 * | 4/2011 | Schmeyer | G06Q 10/02 |
| | | | 705/64 |
| 7,974,889 B2 * | 7/2011 | Raimbeault | G06Q 20/208 |
| | | | 705/26.7 |
| 8,484,078 B1 * | 7/2013 | Mankoff | G06Q 30/0226 |
| | | | 705/14.17 |

OTHER PUBLICATIONS

Office Action for corresponding U.S. Appl. No. 13/796,695 dated Aug. 17, 2015.

* cited by examiner

*Primary Examiner* — Azam A Ansari
(74) *Attorney, Agent, or Firm* — Alston & Bird LLP

(57) ABSTRACT

The rewards program system and method provide an efficient and effective way for customers to enroll in rewards programs, and accrue and redeem rewards at participating merchants. The system generates promotions, analyzes transaction data to identify whether a customer used a promotion, issued by the system (e.g., promotions provider), with a merchant. When the customer redeems a promotion, the system accrues reward amounts in a customer account, and allows the customer to redeem accrued rewards amounts. The system generates credit card profiles and customer profiles, and offers customers subsequent promotions based on the transaction data and/or the customer's customer profile. The system issues the customer subsequent promotions when the amount credited to the rewards account satisfies a redemption threshold. The subsequent promotions may be redeemable at merchants that have promotions issued by the promotion provider, including the merchant where the promotion was used that resulted in the credited amount.

24 Claims, 10 Drawing Sheets

REWARDS PROGRAM

CROSS-REFERENCE TO RELATED APPLICATIONS

This application is a continuation of and claims the benefit of U.S. application Ser. No. 13/796,695, filed on Mar. 12, 2013, which is a non-provisional application that claims the benefit of U.S. Provisional Patent Application No. 61/623,472, filed Apr. 12, 2012, the entire contents of each of which are incorporated herein by reference.

TECHNICAL FIELD

The present description relates to an efficient and effective way for customers to enroll in rewards programs, and to accrue and redeem rewards at participating merchants. This description more specifically relates to analyzing transaction data to identify a customer profile, offering promotions to the customer based on the customer profile, determining whether a customer used a promotion issued by a promotions provider, and in response to using the promotion, crediting a rewards account.

BACKGROUND

Merchants typically offer rewards programs in the hope of enticing customers to return for repeat business. However, customers typically avoid enrolling in the rewards programs because of the burden of tracking the rewards for each merchant separately, and managing the many rewards cards used to accrue rewards for each merchant.

BRIEF SUMMARY

The rewards program system and method provide an efficient and effective way for customers to enroll in rewards programs, and accrue and redeem rewards at participating merchants. The system generates promotions, and when the customer redeems a promotion, the system accrues reward amounts in a customer account, and allows the customer to redeem accrued rewards amounts. The system may accrue the rewards based on customer cash transactions, visits, and/or various other interactions between the merchant and the customer. The system generates credit card profiles and customer profiles, and offers customers subsequent promotions based on the transaction data and/or the customer's customer profile. The system issues the customer subsequent promotions when the amount credited to the rewards account satisfies a redemption threshold. The subsequent promotions may be redeemable at merchants that have promotions issued by the promotion provider, including the merchant where the promotion was used that resulted in the credited amount.

The rewards program system and method provide a way for a promotion provider to credit a rewards account associated with a customer. The system includes one or more memories and a processor in communication with at least one of the one or more memories. The processor is configured to execute processor executable instructions stored in the one or more memories. The instructions cause the processor to access transaction data that identifies a transaction between a customer and a merchant, and access customer unique payment information (such as a credit card number) correlated to the customer. The transaction data may include a merchant identifier, credit card information, and a transaction amount. The customer unique payment information may be derived from interaction of the customer with the promotion provider (such as by using the credit card number to pay for a promotion issued by the promotion provider). The processor may determine whether the transaction data includes the customer unique payment information. If so, the instructions credit to a rewards account associated with the customer. The credit to the rewards account may be based on the transaction amount, and may be associated with the merchant. Further, the system may redeem the credit to the rewards account by issuing a promotion, via the promotion provider. The promotion may be based on the credit to the rewards account and may be for use at the merchant.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The rewards program system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Figure 1:
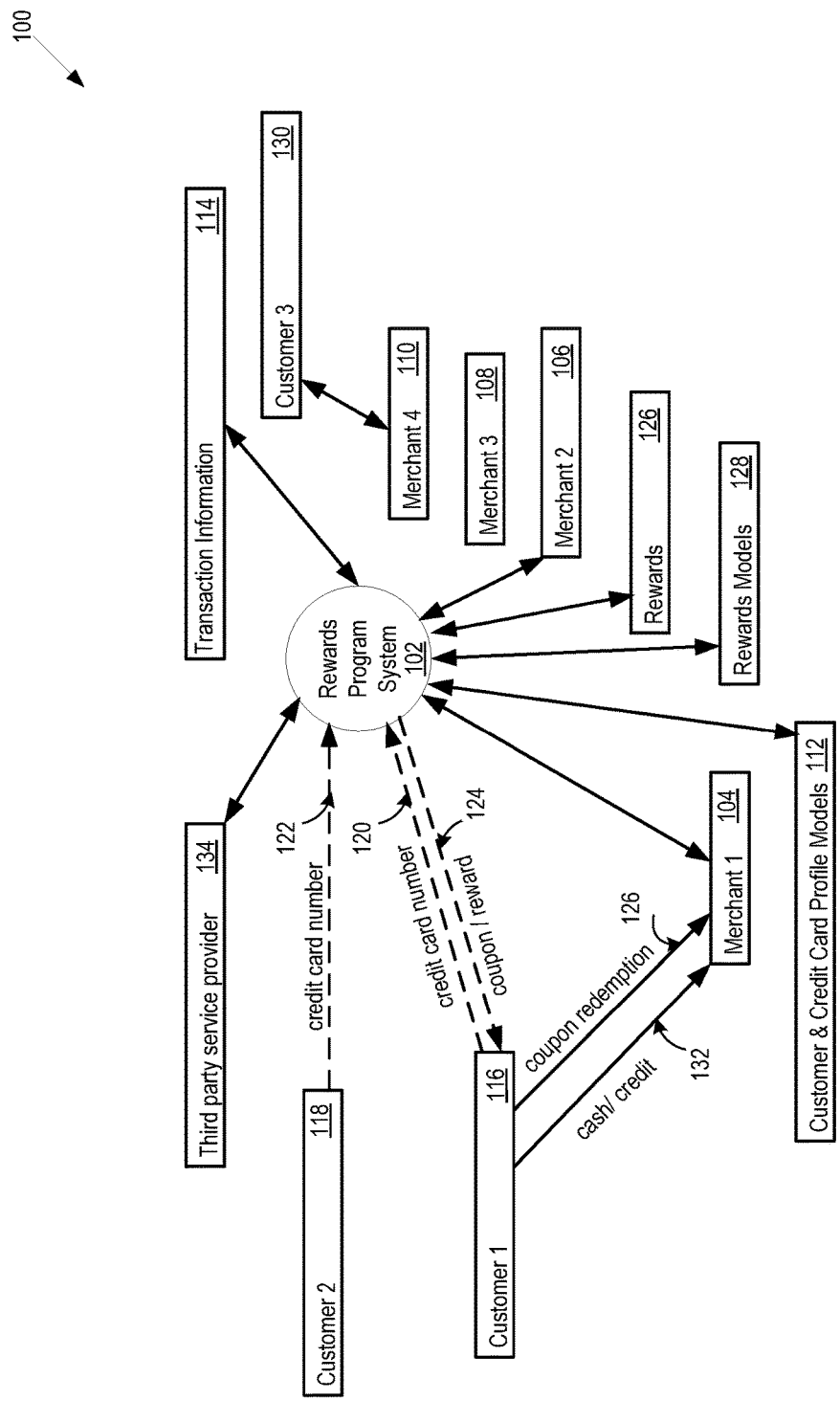
FIG. 1 shows a configuration of the rewards program system.

FIG. 1 shows a configuration 100 of the rewards program system 102. A promotions provider may use the rewards program system 102 to offer consumers an easy way to enroll in multiple rewards programs with multiple merchants (e.g., a single registration for customers to receive rewards from merchants the customers do business with). The rewards program system 102 may be in communication with member merchants (104, 106). The promotions provider may use the rewards program system 102 to develop services for and/or acquire information from other non-member merchants (108, 110) not in communication with or not registered with the rewards program system 102. The rewards program system 102 maintains a member profile (e.g., generated by models 112) of the member merchants (104, 106) in communication with the rewards program system 102, and statistical analysis for each of the member merchants (104, 106).

The rewards program system 102 is configured to be a part of (or receive data from) a promotion system that registers customer payment data (e.g., a credit card number). After registration, the rewards program system 102 may review transaction information 114 (which may include credit card numbers) in order for the rewards program system 102 to credit customers for transactions that are external to the promotion system.

For example, the customer may register with the rewards program system 102, thereby joining a single loyalty/rewards program. The customer's registration may comprise submitting the customer's unique payment information (e.g., a credit card number, debit card number, or the like) in order to purchase a promotion offered by a promotion system or in the context of submitting the customer's unique payment information to register with the promotion system. A promotion may include any type of reward, discount, coupon, credit, voucher or the like used toward part (or all) of the purchase of a product or a service. As discussed above, the rewards program system 102 may be a part of (or receive data from) the promotion system in order to obtain access to the unique payment information. Thereafter, the rewards program system 102 uses the unique payment information to review transactions between the customers and other entities (such as merchants who are registered or not registered with the rewards program system 102) in order to credit the customers in the rewards program.

As one example, the rewards program system 102 may review transaction information for unique rewards account information (such as the customer's unique payment information, a customer identifier, a merchant identifier, a promotion, etc.) in order to determine whether to credit the customer for a transaction, as discussed in more detail below. In this regard, although referred to as "unique" rewards account information, the information may not be entirely unique, but need only provide enough specificity to enable the promotion provider to identify a particular customer, merchant, or rewards account. In this way, the customer's interaction with the promotion system enables tracking and crediting of transactions that are external to the promotion system.

The rewards program system 102 may communicate with member customers (116, 118) via preferences selected (e.g., email, voice mail, multimedia, physical mail) by the member customers (116, 118). In the context of the rewards program 102 being a part of the promotion system, the rewards program system 102 includes a registration process where the member customers (116, 118) provide unique rewards account information, such as one or more credit card numbers (120, 122), a phone number, or wallet token number, that the rewards program system 102 may use as a customer identifier when subsequently reviewing the transaction information 114. A customer (116, 118) may provide a credit card number (120, 122) in order to complete a transaction to purchase a reward 124 offered by the rewards program system 102, and/or create/update a customer profile to include multiple credit card numbers. Alternatively, the rewards program system 102 may be in communication with the promotion system in order to receive the customer's credit card number.

The rewards program system 102 provides merchants (104, 106) with an efficient and effective rewards program without the merchants expending additional resources to manage the rewards program. In particular, the rewards program system 102 uses the transaction information 114 that is already generated when the customer pays by credit card, debit card, or the like. So that, the merchant can use the existing payment mechanisms, such as the existing credit card payment mechanism, in order to participate in the rewards program.

The rewards program system 102 also may track (e.g., using manual or automated procedures) any interaction between a customer and merchant. For example, the customer paying with cash, visiting the merchant (e.g., with friends of the customer, without completing a transaction with a credit card), interacting with a special offer (e.g., a customer redeeming a coupon without a transaction). Anything that matches the customer at the merchant that could be tracked by both.

The rewards program system 102 may optionally include additional functionality, such as providing a way to track redemptions 126 and issue rewards 124 for multiple types of transactions (e.g., a promotion redemption transaction and a cash/credit transaction 132). The rewards program system 102 may use rewards models 128 to generate and recommend high return on investment rewards 124 to customers and merchants. The rewards program system 102 uses the multiple types of transactions and the purchase behaviors of the customers, as determined from the transaction data 114, to develop customer profiles 112 for member customers (116, 118) and non-member customers 130.

As discussed in more detail below, customers and merchants may be registered with the rewards program system 102. In the context of a customer (116, 118), after registration, the rewards program system 102 correlates unique rewards account information, such as the credit card information, customer identifier (e.g., the customer's email address, telephone number, wallet token number, etc.), and/or purchased promotions to a customer (116, 118). Accordingly, the rewards program system 102 may review transaction data (that may include the credit card number, customer identifier, and/or an indication of a promotion) in order to determine whether the transaction data is associated with a registered customer. Likewise, merchants may be registered with the rewards program system. In the context of merchants 104, after registration, the rewards system 102 correlates the merchant identifier to a registered merchant. In this way, the rewards program system 102 may review the transaction data (that includes merchant identifiers) to determine whether the merchants are registered.

As discussed in more detail below, the rewards program system is configured to identify at least four different scenarios. First, the rewards program system is configured to identify a registered customer that interacts (such as completes a transaction) with a registered merchant. The rewards program system, in turn, may credit the registered customer's rewards account with the transaction at the registered merchant. Further, the rewards program system may compile a list of known customers (including the registered customer) in order to provide information to the registered merchant (such as providing profiles of the registered merchant's customers, providing information on potential deals for the registered merchant, etc.).

Second, the rewards program system is configured to identify a registered customer that interacts with a non-registered merchant. A non-registered merchant is a merchant that does not participate in the rewards program; however, the rewards program system may track the activity and/or identify of the non-registered merchant. The rewards program system may use this information to profile the registered customer. Third, the rewards program system is configured to identify a non-registered customer that interacts with a registered merchant. The rewards program system may use this information to profile the registered merchant. Further, the rewards program system may profile the non-registered customer (such as based on all transactions associated with the non-registered customer's credit card). Fourth, the rewards program system is configured to identify a non-registered customer that interacts with a non-registered merchant. The rewards program system 102 provides a way to offer rewards to customers for multiple types of transactions, (e.g., purchases of products and/or services using cash, credit, coupon discounts, and accrued rewards).

Figure 2:
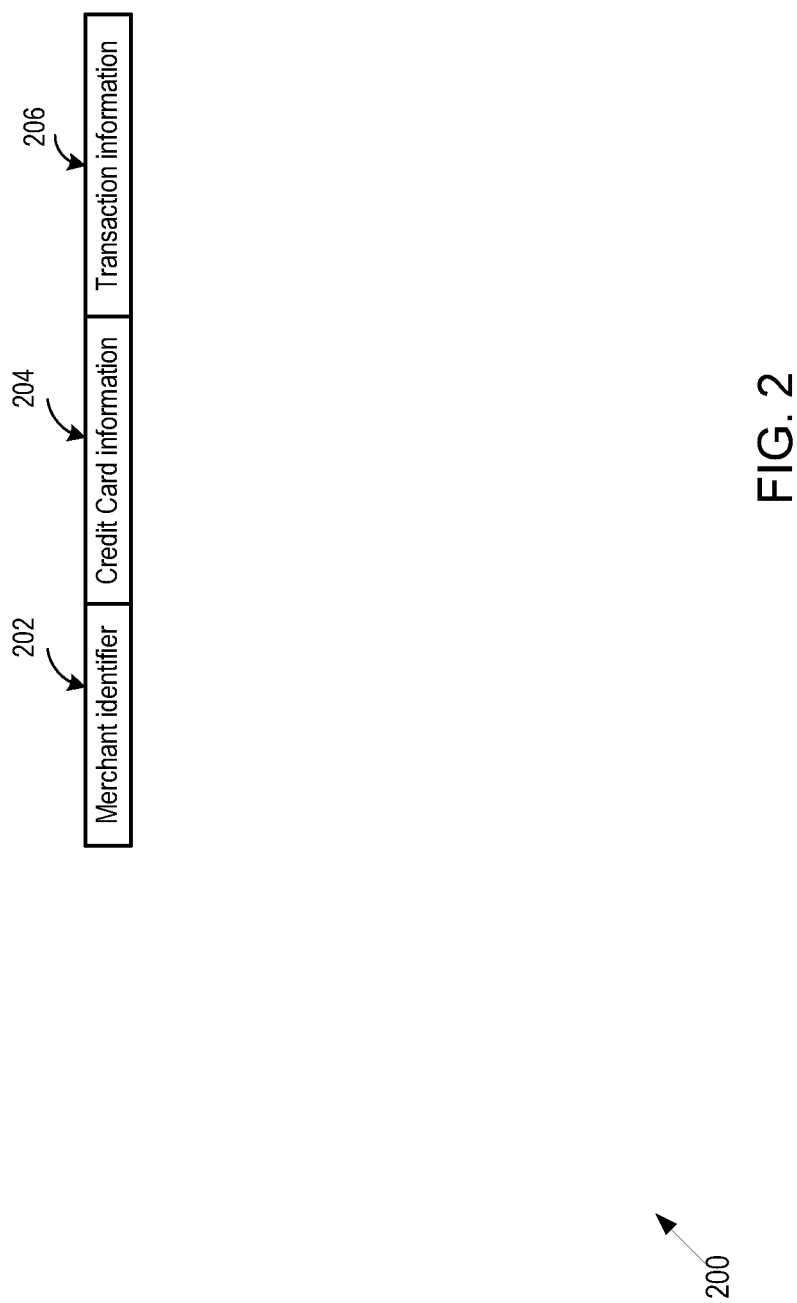
FIG. 2 shows transaction data from a transaction between a customer and a merchant.

FIG. 2 shows transaction data 200 from an example transaction 132 between a customer 116 and a merchant 104. In this case, the transaction is a card transaction. The rewards program system 102 may use a matching algorithm to analyze the transaction data (e.g., a hash function). The rewards program system 102 identifies each member merchant (104, 106) by a merchant identifier 202. The transaction data (114, 200) identifies the customer (e.g., credit card information 204 that may refer to a credit account, debit account, and/or a merchant account), the merchant, and the transaction information 206 (e.g., transaction amount, transaction date, transaction currencies). When the rewards program system 102 receives transaction data 200 (e.g., in real-time or after the transaction), the rewards program system 102 directs (e.g., associates and/or attributes) each transaction to a merchant (e.g., using the merchant identifier 202). When credit card information 204 for a transaction is available, the rewards program system 102 may identify the merchant by the merchant identifier 202.

The rewards program system 102 aggregates data to determine the transactions associated with a credit card (120, 122, 204), and analyzes the credit card transaction history. When the credit card (120, 122, 204) is identified to belong to a registered customer (116, 118) (e.g., a customer who has joined the loyalty/rewards program offered by the rewards program system 102 and/or purchase a promotion from the rewards program system 102 using the credit card 120, 122), the rewards program system 102 uses the transaction data to identify one or more merchants with whom the customer transacted business. The rewards program system 102 may use a database that correlates the names of customers and credit card numbers (120, 122, 204), so that when the user uses the credit card (120, 122, 204) at the merchant, the rewards program system 102 can identify the customer.

The transaction information (114, 200) identifies the merchants at which the customer shopped, how much the customer spent at the various merchants, and the amount of rewards accrued by the customer (e.g., accrued reward amount). The rewards program system 102 performs customer purchase behavior analysis and determines discounts and rewards offers of complementary promotions, goods, and/or services to present to the customer (e.g. promotions selected on the basis of the customer's profile and purchase behavior). In addition, other systems may interface with the rewards program system 102 to use the analysis and transaction data to identify offers to present to customers. The rewards program system 102 may filter out (e.g., avoid) unnecessary advertisement and offerings selling promotions to low return on investment customers (e.g., new customers already captured by the merchant, or customers who have stopped patronizing the merchant).

Figure 3:
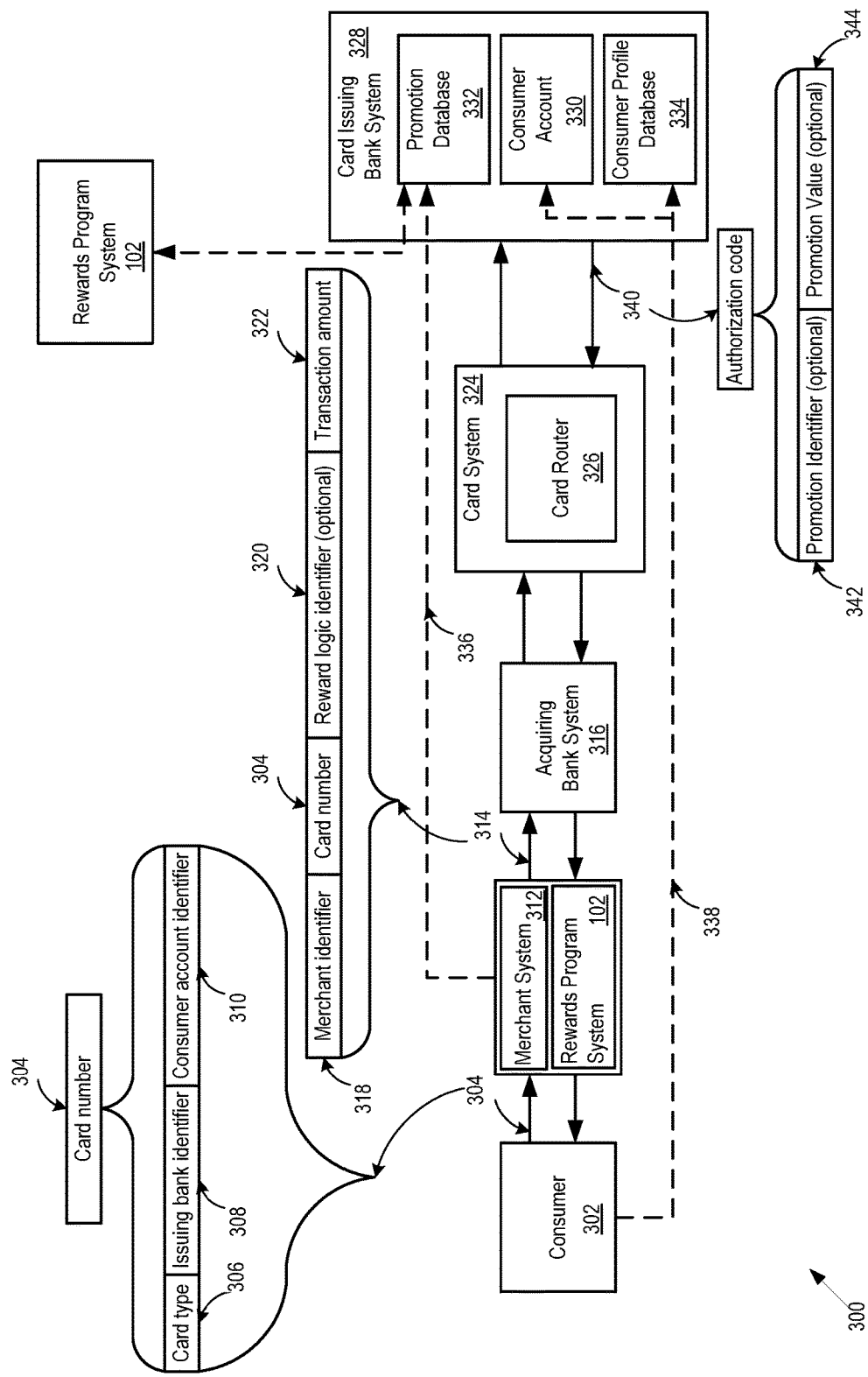
FIG. 3 shows a representation of a transaction processing system processing a credit card transaction.

FIG. 3 shows a representation 300 of a transaction processing system processing a credit card transaction. The example of the credit card transaction is merely for illustration purposes. Other types of card transactions, such as debit card transactions or charge card transactions, are contemplated. When a consumer 302 (e.g., customer) uses a credit card to complete a transaction, the consumer 302 presents the credit card (e.g., a Visa® credit card). The credit card includes a credit card number 304, which identifies the type of card 306, the card issuing bank 308, and the consumer's account 310. The merchant (e.g., merchant system 312) inputs the credit card number 304 (such as by swiping the credit card through a machine that reads information from the magnetic stripe on the back of the card or by manually inputting the credit card number), and inputs the transaction amount (e.g., on the keypad in the merchant system 312). When the consumer 302 (e.g., customer) uses a credit card to purchase a promotion and/or register (i.e., enroll) in a rewards program from the rewards program system 102, similar data exchange that occurs between the consumer 302 and the merchant system 312 and the merchant system 312 and the acquiring bank system 316 may occur. The merchant system 312 sends an authorization request 314 to the acquiring bank system 316, which is the bank that handles the merchant's credit card account, in order to obtain authorization for the transaction. The authorization request 314 may include a merchant identifier 318 (or other type of transaction identifier), the card number 304, optionally a reward logic identifier 320, and a transaction amount 322. The acquiring bank system 316 in turn forwards the authorization request 314 to the card processing system 324, which may use a card router 326 to identify a card issuing bank system 328 corresponding to the credit card number 304 and to forward the authorization request 314 to the card issuing bank system 328.

The card issuing bank system 328 is the bank that issued the credit card 304 to the consumer 302, and maintains up-to-date information on the consumer's account 330 (e.g., account balance and account status). The card issuing bank system 328 may maintain a promotion database 332, and a consumer profile database 334. Alternatively, the rewards program system 102 may maintain the promotion database 332, and the consumer profile database 334, and/or a separate consumer profile database 334. The merchant system 312 and/or the rewards program system 102 may periodically communicate updates 336 to the promotion database 332, while the consumer 302 periodically communicates updates 338 to the consumer profile database 334.

The card issuing bank system 328 determines whether to authorize the transaction for the transaction amount. The card issuing bank system examines the customer account 330 of the consumer 302 to determine whether the customer account 330 has sufficient credit balance to cover the transaction. If so, the card issuing bank system 328 authorizes the transaction and generates an authorization code 340. The authorization code 340 is sent back to the acquiring bank system 316 (through the card processing system 324), which sends the authorization code 340 as an approval or denial code to the merchant system 312 that sent the authorization request 314. In one embodiment, the authorization code 340 may optionally include a promotion identifier 342 and a promotion value 344 that identifies a redeemable value amount for the promotion identified by the promotion identifier 342.

The card processing system 324 may also coordinate the transfer of funds from the card issuing bank system 328, which pays for the transaction and extends credit to the consumer 302, to the acquiring bank system 316, which holds an account in the merchant's name. The actual transfer of money between the acquiring bank system 316 and the issuing bank system 328, and the actual debiting of the consumer's account 330 typically may not occur until sometime after authorization of the transaction (e.g., a day or two after the actual transaction date). In the meantime, the issuing bank system 328 usually places a pending charge on the consumer's account 330, and counts the transaction against the consumer's remaining available credit limit even though the transaction has not yet cleared. In the context of the present transaction processing system, in which transactions for promotions, rewards, or specific products/services are processed, the reconciliation for authorization of the promotion, reward, or specific product/service may occur contemporaneously with the authorization, or may occur at a later time (such as a day or two after the authorization).

As discussed above, the transaction processing system may process credit cards, debit cards, and/or charge cards. A charge card requires that the cardholder pay off the balance in full each month, and may not have a preset limit. Instead, purchases are approved based on the cardholders spending and payment history, financial resources and credit record. A debit card (also known as a bank card or check card) is a card that provides a customer 302 with electronic access to the customer's bank account(s) at a financial institution.

Figure 4:
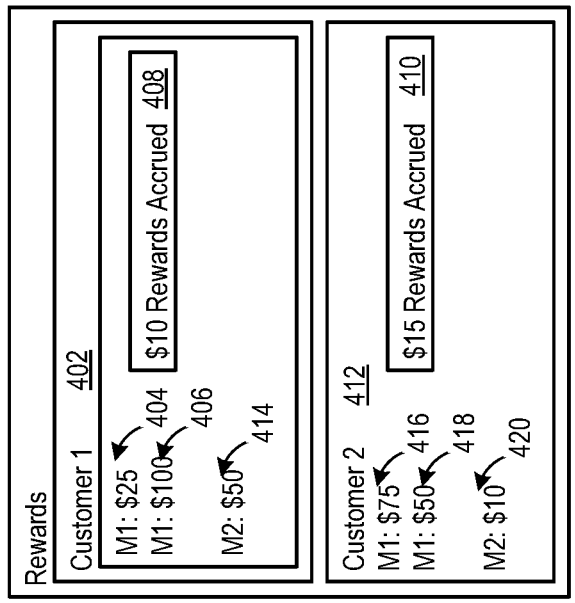
FIG. 4 shows customer rewards accounts.

FIG. 4 shows customer rewards accounts 400. The rewards program system 102 includes logic that processes and handles multiple types of transactions 114. For example, the customer 402 may have multiple transactions with a merchant (e.g., member merchant), including a promotion redemption transaction 404 (e.g., $25) from the rewards program system 102 and a cash/credit transaction 406 (e.g., $100) that does not involve the rewards program system 102. The rewards program system 102 receives transaction data 114 and/or determines when the customer 402 redeems a coupon from the rewards program system 102. The rewards program system may not be involved in the transaction, and may determine or receive information about the cash/credit transaction indirectly. For example, the merchant 104 (e.g., member merchant) may communicate the cash/credit transaction 406 to the rewards program system 102. Alternatively, the rewards program system 102 may retrieve the cash/credit transaction 132 from the merchant 104 or from a third party source 134.

In addition to reviewing card transactions between the customer and the merchant, the rewards program system 102 is configured to identify when a transaction involves redemption of a promotion, and to accrue a reward amount (408, 410) for each transaction (404, 406, 414, 416, 418, 420) that involves redemption of the promotion. The rewards program system 102 may accrue a reward amount (408, 410) for both customers (402, 412) and merchants. The rewards program system 102 may allow customers to redeem the accrued reward amount (408, 410) when the accrued reward amount (408, 410) satisfies one or more accrued reward amount thresholds. The rewards program system 102 may allow customers (402, 412) to redeem the accrued reward amount (408, 410) at a member merchant, for whom the reward discount coupons were issued, or any member merchants of the rewards program system 102, or any non-member merchants, or any combination thereof. When the rewards program system 102 identifies that a merchant received a coupon for a coupon redemption transaction (404, 416) (e.g., $25, $75) and/or completed a cash/credit transaction (e.g., $100), the rewards program system 102 calculates one or more rewards (408, 410) (e.g., accrued rewards) for the member customers (402, 412). For example, the accrued rewards (408, 410) calculated by the rewards program system 102 may be for a coupon redeemed with the merchant that issued the original coupon, or multiple merchants, or another merchant other than merchant that issued the original coupon.

Figure 5:
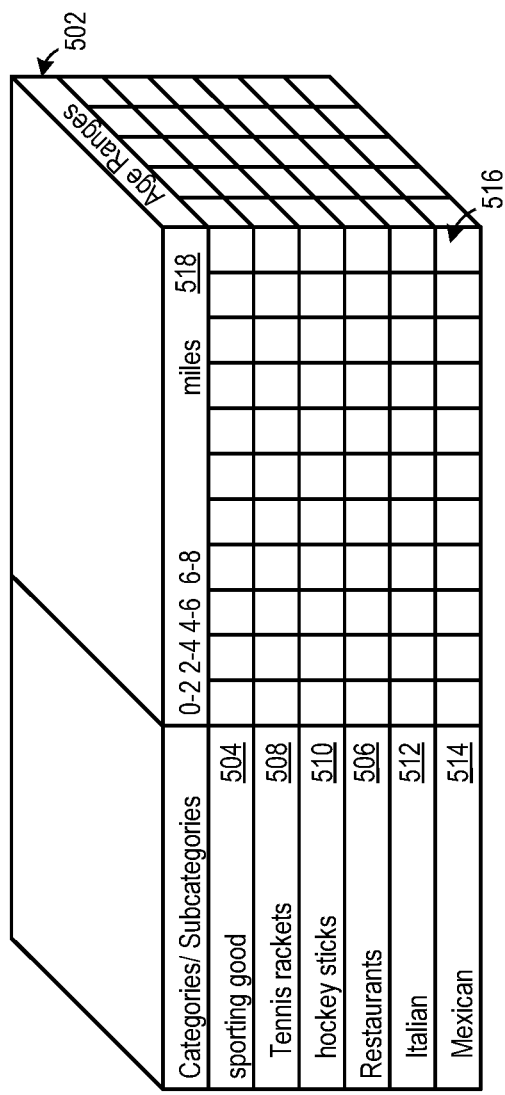
FIG. 5 shows customer profile model.

FIG. 5 shows customer profile model 500. The rewards program system 102 develops new unique rewards account information and/or identifies existing unique rewards account information, such as customer profiles (e.g., distinguishing characteristics of customers generally and customer profiles specific to respective merchants) and credit card profiles (e.g., distinguishing characteristics of credit cards usage generally and/or compatible customer profile types), based on the transaction data 114. The rewards program system 102 provides analysis to other systems regarding the types of customers (e.g., customer types and/or specific customers when a customer's identity is known) to target generally and/or target using the rewards program. The rewards program system 102 may determine or use another system to determine the types of customers to target by categorizing customer profiles and credit card profiles into various levels of granularity (e.g., age, age ranges 502, gender, home address, distance from reward 518 and other demographic information). The rewards program system 102 and/or another system may generate multidimensional matrices (500) to determine the types of customers a merchant may want to target. For example, the rewards program system 102 may identify male customers in a 2 mile radius of a merchant (e.g., a rewards program coupon discount offering) and categories (504, 506) and subcategories (508, 510, 512, 514) of products and services (e.g., sporting good, tennis rackets, hockey sticks, baseball bats, tennis shoes, basketball shoes) available for offer to customers. Each node 516 (e.g., row-column dimension) of the profiles model multidimensional matrix includes a calculated probability of a particular customer profile and or the customer of accepting a reward offer. The profiles model multidimensional matrix may be used to generate credit card profiles.

The rewards program system 102 may provide the customer profiles and credit card profiles to other systems (e.g., to identify both member and non-member customers to target to present coupon discounts offering). The rewards program system 102 analyzes the customer profiles and/or credit card profiles to determine the appropriate types of coupon discount offerings (e.g., for which products and services) to offer to customers and the appropriate customers to offer such coupon discount offerings. The rewards program system 102 identifies those coupon discount offerings to avoid because of a high probability that customers will purchase the product and/or service with or without a coupon discount offerings.

Figure 6:
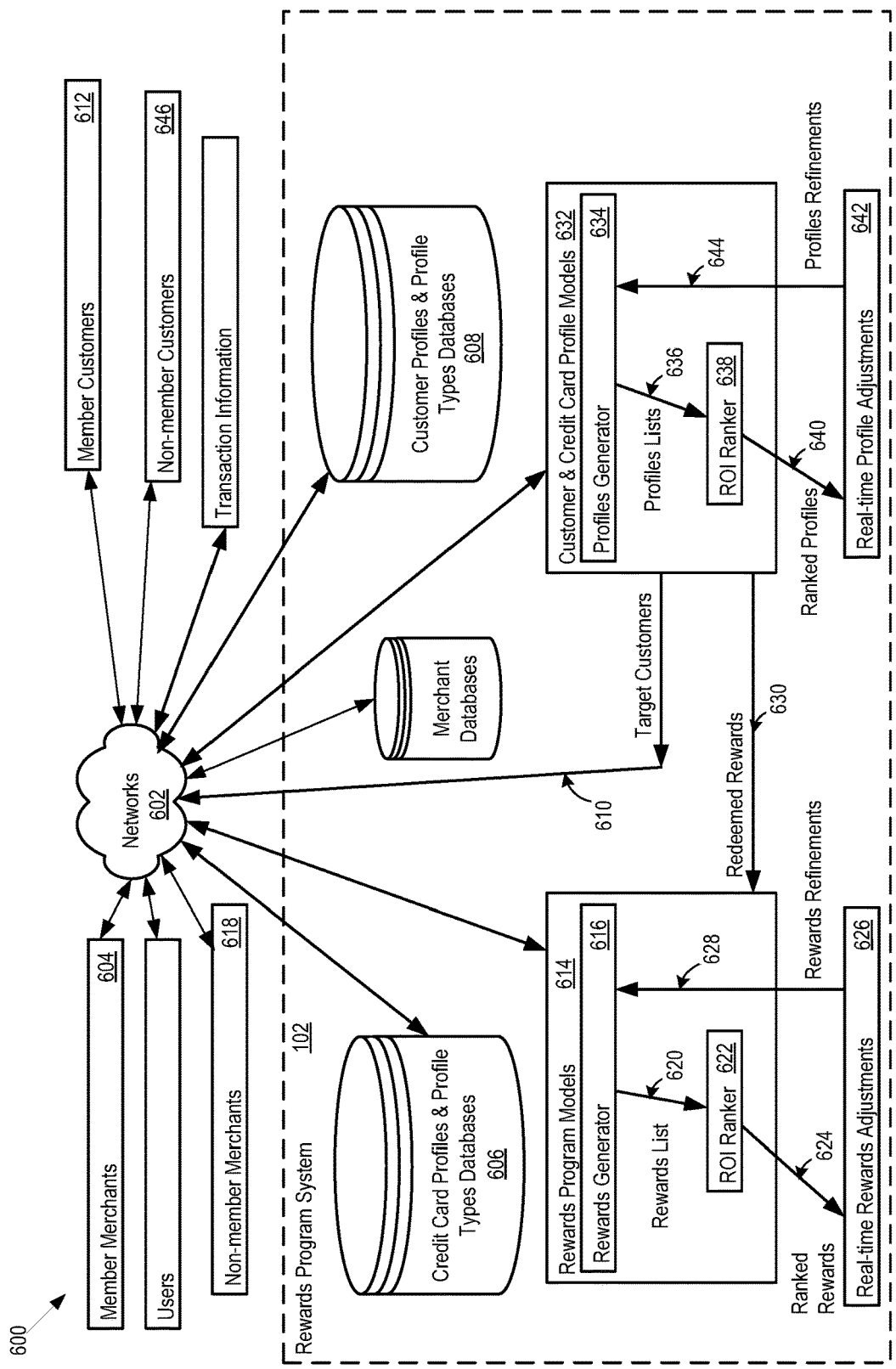
FIG. 6 shows components of the rewards program system.

FIG. 6 shows components 600 of the rewards program system 102. The components of the rewards program system 102 may be in communication via a network (e.g., Internet) 602. The rewards program system 102 may develop credit card profiles 606 to identify customers to target promotions. Member merchants 604 may register with the rewards program system 102 to implement a loyalty and/or rewards program, and participate in offering promotions to customers, and receive customers profiles and customers profile type information 608. Member customers 612 may register with the rewards program system 102 to receive rewards discounts (e.g., promotions).

The rewards program system 102 may include one or more rewards program models 614 used to generate rewards programs (e.g., using a rewards generator 616) to recommend rewards (e.g., promotions) to customers and/or potential customers (e.g., non-member customers 646). The rewards generator 616 may generate a list of rewards 620 and use a return on investment (ROI) ranker 622 to rank (624) the rewards according to a predicted return for each reward identified by the list of rewards 620. The rewards program system 102 may use the ranked rewards 624 to identify real-time rewards adjustments 626 to the rewards generator 616 and communicate rewards refinements 628 to the rewards generator 616. The rewards program models 614 may also receive redeemed rewards 630 information to assist in refining rewards generator 616.

The rewards program system 102 may include one or more customer profile models and credit card profile models 632 used to generate profiles and profile types (e.g., using a profiles generator 634). The profiles generator 634 may generate a list of profiles 636 (e.g., customer profiles and credit card profiles, and customer profiles types and credit card profiles types) and use a return on investment (ROI) ranker 638 to rank (640) the profiles and profile types according to a predicted return for each of the profiles and profiles types identified by the list of profiles 636. For example, the ROI ranker 638 may determine the ROI for a customer, a credit card, and/or profile types of customers resulting from the use of the rewards programs generated by the rewards program system 102. The rewards program system 102 may use the ranked profiles 640 to identify real-time profile and profile type adjustments 642 to the profiles generator 634 and communicate profiles refinements 644 to the profiles generator 634.

The rewards program system 102 may use the customer profiles and/or credit card profiles analysis to demonstrate ROI statistical probabilities (e.g., guarantees) to non-member customers to encourage registration as member customers of the rewards program system. The rewards program system 102 may use the customers profiles analysis and customer demographics (e.g., identifying customers and/or customer profiles) to develop rewards program strategies.

Figure 7:
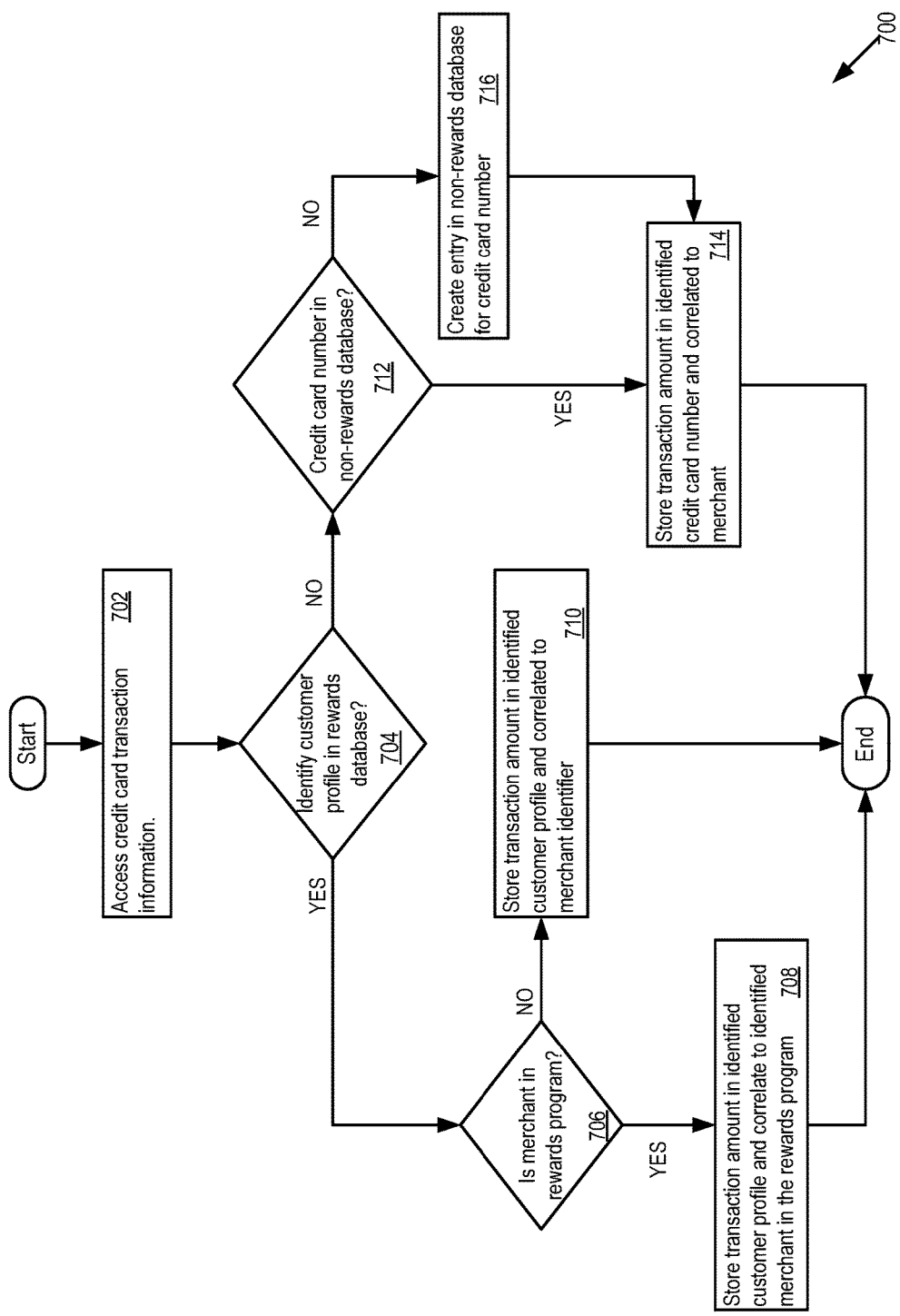
FIG. 7 shows a flow diagram of logic the rewards program system may use.

FIG. 7 shows a flow diagram of logic 700 the rewards program system may use. The rewards program system logic implements a method that includes accessing, in at least one memory, transaction data between customers and merchants for purchases by the customers of goods and/or services offered by merchants (702). The transaction data includes a transaction record for transactions between merchants and customers, an example of which is illustrated in FIG. 2. The rewards program system 102 accesses at least a part of the transaction data (such as the credit card information 204) and searches a rewards database to identify corresponding unique rewards account information, such as a customer profile, in the rewards database (704). When the rewards program system 102 identifies unique rewards account information, such as a customer profile, in the rewards database (e.g., a credit card information 204 in the transaction data matches a credit card number in the rewards database), the rewards program system 102 determines whether the merchant is a member merchant in one or more rewards programs generated by the rewards program system 102 (706). For example, the rewards program system 102 accesses at least a part of the transaction data (such as the merchant identifier 202) and searches a merchant database to identify a merchant profile in the merchant database. When the merchant is identified as a member merchant, the rewards program system 102 stores the transaction amount in the identified customer profile and correlates the transaction amount and identified customer profile with the identified member merchant (708). When the merchant is not identified as a member merchant, the rewards program system 102 stores the transaction amount in the identified customer profile and correlates the transaction amount and identified customer profile with the merchant (e.g., non-member merchant) (710).

When the rewards program system 102 does not identify the customer profile in the rewards database, the rewards program system 102 searches a non-rewards database to identify the credit card number (712). When the credit card number is identified in the non-rewards database, the rewards program system 102 stores the transaction amount with the identified credit card number in a credit card profile and correlates the transaction amount and identified credit card number with the merchant (714). In this instance, the rewards program system 102 has previously reviewed transaction data associated with the credit card number, and has previously created a credit card profile. When the credit card number is not identified in the non-rewards database, the rewards program system 102 creates new unique rewards account information, in this case a credit card profile, for the credit card number, and stores the transaction amount with the credit card number in the created credit card profile and correlates the transaction amount and credit card number with the merchant (714).

Figure 8:
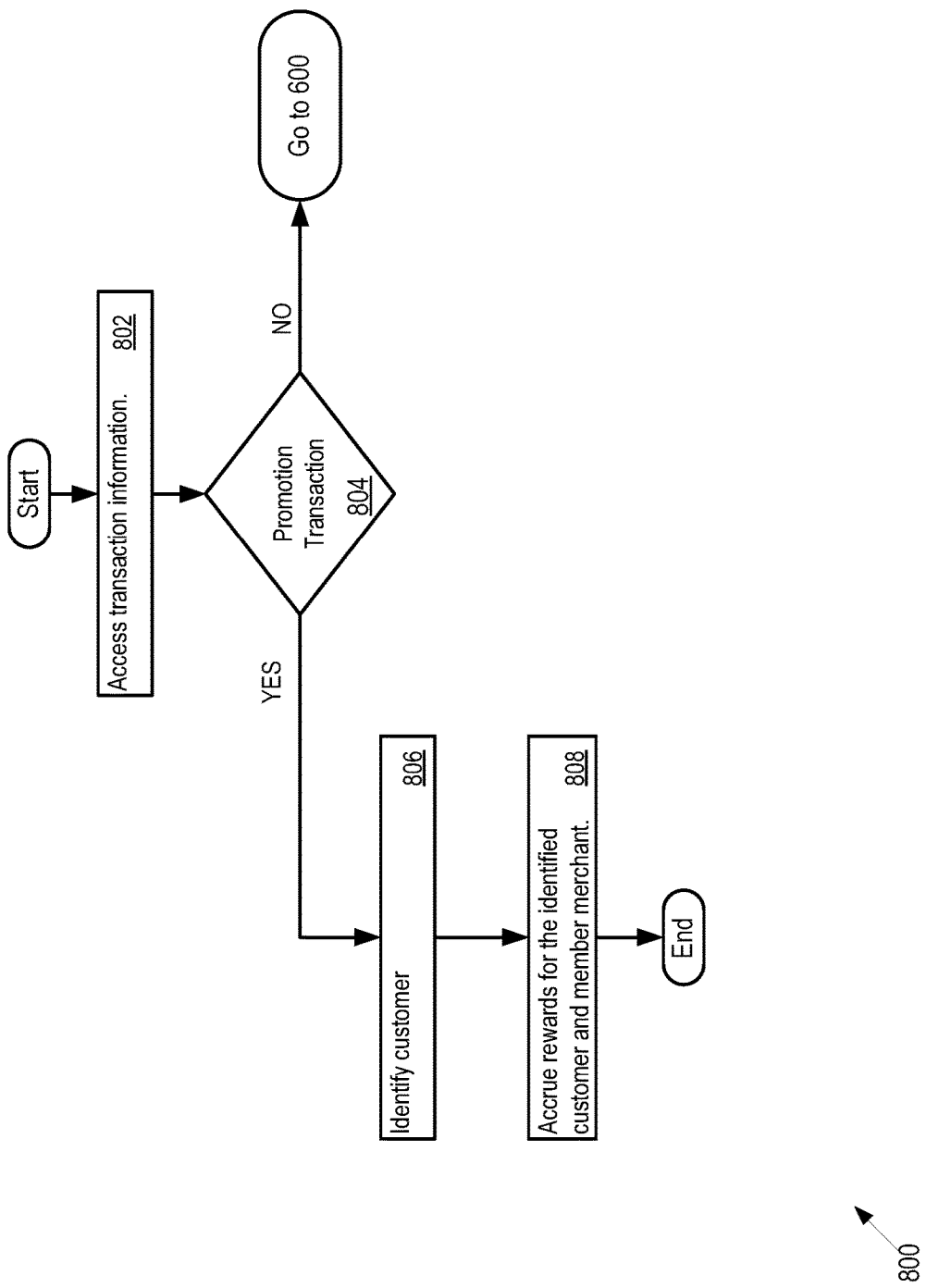
FIG. 8 shows a flow diagram of logic the rewards program system may use when identifying a rewards program transaction.

FIG. 8 shows a flow diagram of logic 800 the rewards program system may use when identifying a rewards program transaction. The rewards program system logic implements a method that includes accessing, in at least one memory, transaction data between customers and merchants for purchases by the customers of goods and/or services offered by merchants (802). The transaction data includes a transaction record for each transaction between merchants and customers. The rewards program system 102 determines whether the transaction record identifies a promotion transaction that identifies a transaction completed using a promotion generated by the promotion system (804). When the transaction record identifies a promotion transaction (e.g., redeeming a coupon discount), the rewards program system identifies the member customer (806) and accrues rewards for the member customer and the member merchant. When the accrued rewards satisfy a redemption threshold, the rewards program system may notify the member customer and the member merchant. When the accrued rewards satisfy the redemption threshold, the member customer, or the member merchant, or another member merchant, or any combination thereof, may receive a promotion or a redemption amount to use for a current transaction (e.g., real-time notice) or future transaction. The notice to the member customer may be via preferences selected (e.g., email, voice mail, multimedia, physical mail).

Figure 9:
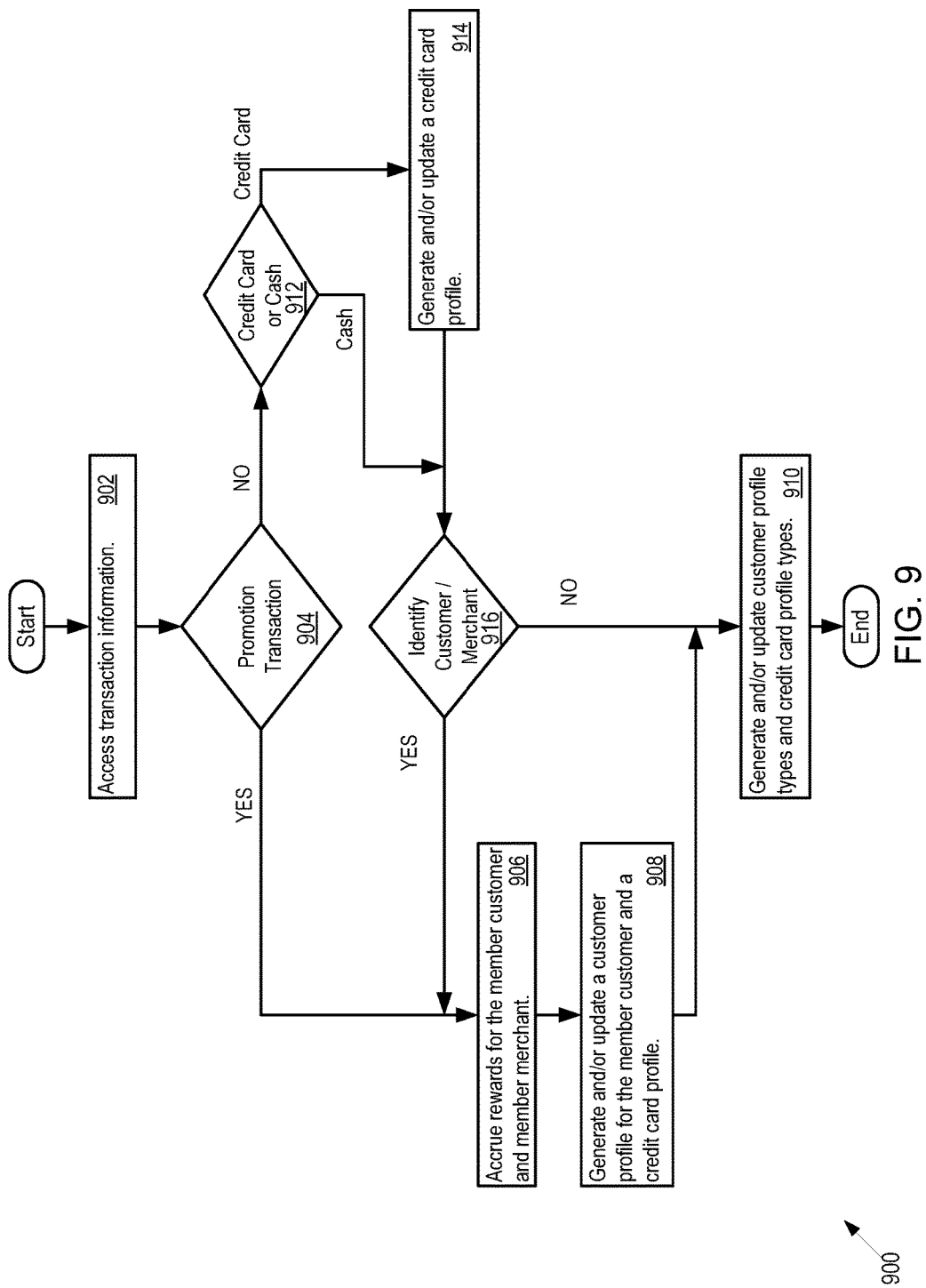
FIG. 9 shows a flow diagram of other logic the rewards program system may use.

FIG. 9 shows a flow diagram 900 of other logic the rewards program system may use. The rewards program system logic implements a method that includes accessing, in at least one memory, transaction data between customers and merchants for purchases by the customers of goods and/or services offered by merchants (902). The transaction data includes a transaction record for each transaction between merchants and customers. The rewards program system 102 determines whether the transaction record identifies a promotion transaction that identifies a transaction completed using a promotion generated by the promotion system (904). When the transaction record identifies a promotion transaction (e.g., redeeming a coupon discount), a member customer and a member merchant to the rewards program transaction may be identified, and the rewards program system accrues rewards for the member customer and the member merchant (906). When the accrued rewards satisfy a redemption threshold the rewards program system may notify the member customer and the member merchant. When the accrued rewards satisfy the redemption threshold the member customer, or the member merchant, or another member merchant, or any combination thereof, may receive a promotion or a redemption amount to use for a current transaction (e.g., real-time notice) or future transaction. The notice to the member customer may be via preferences selected (e.g., email, voice mail, multimedia, physical mail). The rewards program system uses the transaction data to generate and/or update a customer profile for the member customer, and a credit card profile (908). The rewards program system also uses the transaction data to generate and/or update customer profile types (e.g., identify types of customers), and credit card profile types (e.g., identify types of credit card usage) (910). The rewards program system calculates a rewards program transaction return on investment (ROI) for the rewards program transaction for the member customers, and generates a rewards program strategy to offer promotions to customers based on the customer profile, or the customer profile types, or the credit card profile, or the credit card profile types, or the rewards program transaction ROI, or any combination thereof.

When the transaction record does not identify a rewards program transaction, the rewards program system may identify whether the transaction is a cash transaction or a credit card transaction (912). When the customer uses cash for the transaction, the merchant may enter the amount paid in cash by the customer into a point of sale device and enter a customer identifier (e.g., the customer's email address, telephone number, wallet token number) associated with the customer's rewards account. The rewards program system may store the customer identifier as unique rewards account information in the customer's profile. In practice, the rewards program system may receive the cash transaction information (which includes the customer identifier and the cash transaction amount), identify the customer using the customer identifier (by searching for the identifier in customer profiles), and credit the identified customer with the cash transaction. In this way, the rewards program system may incent the customer to share an email address when paying with cash. The rewards program system may receive from member merchants an email address for non-member customers completing cash transactions and track transactions (e.g., accrue potential rewards) for the email address used by the non-member customer, and email rewards to the non-member customer and offer to convert the non-member customer's account into a regular rewards account (e.g., create a rewards account) and thereby make the customer a member customer of the rewards program system.

When the transaction record identifies the transaction as a credit card transaction, the rewards program system may generate a credit card profile for the identified credit card number (914), even though the identity of the customer may not be known (e.g., the credit card number may be from a non-member customer or the rewards program system may have another/different credit card number associated with the member customer). The rewards program system attempts to match the credit card number and/or the transaction record (e.g., a cash transaction) with a member customer and identify a member merchant from the transaction record (916). When the rewards program system identifies a member customer and/or a member merchant the rewards program system accrues rewards for the member customer and the member merchant (906) and generates and/or updates a customer profile for the member customer (908). The rewards program system also uses the transaction data to generate and/or update customer profile types and credit card profile types (910).

Figure 10:
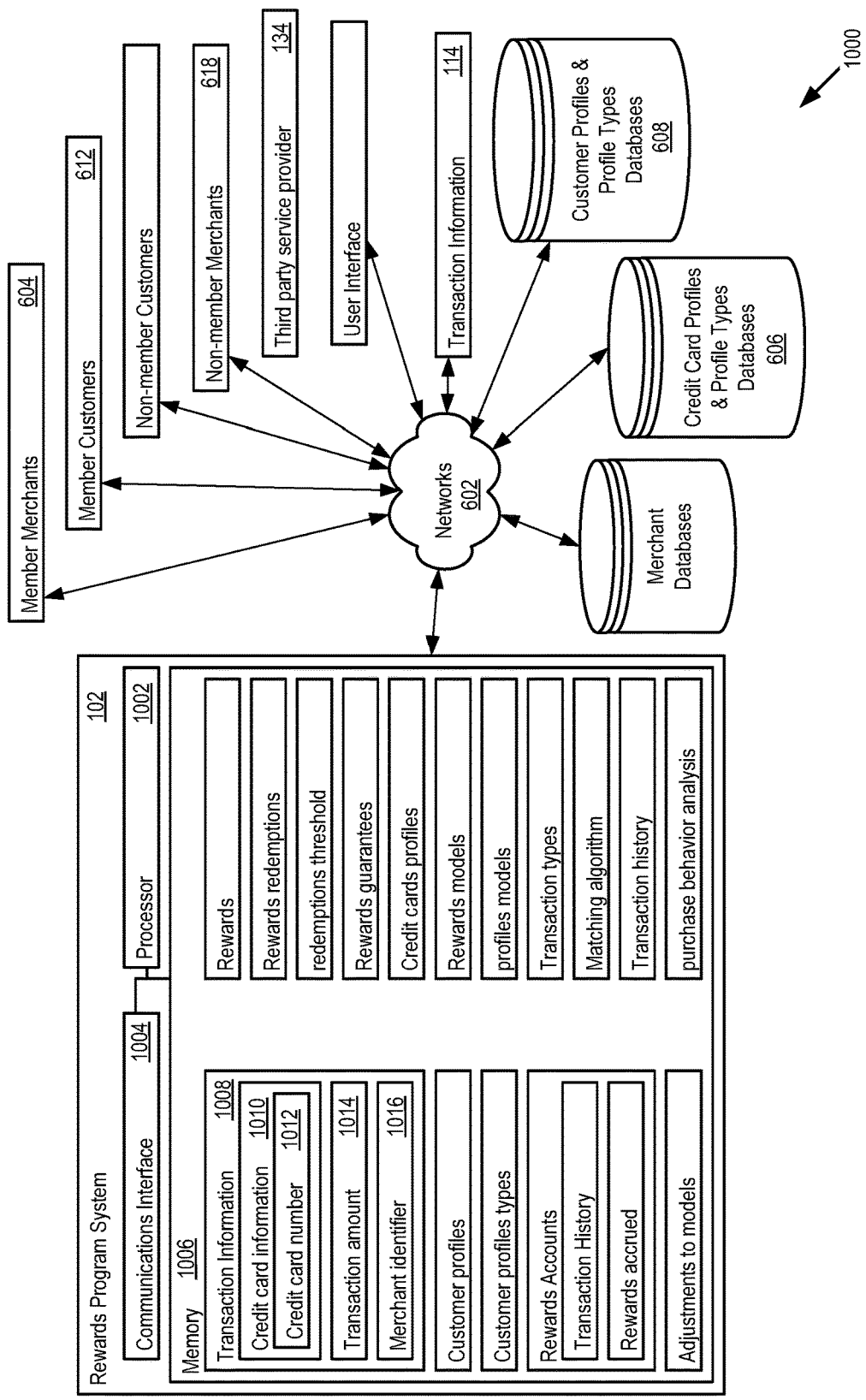
FIG. 10 shows another configuration of the rewards program system.

FIG. 10 shows another configuration 1000 of the rewards program system 102. The rewards program system 102 may include a processor 1002 coupled to a communications interface 1004 in communication with components of the configuration via a network. The rewards program system 102 includes one or more computer readable memories 1006 that include transaction data 1008, credit cards information 1010 (e.g., one or more credit card numbers 1012 used as a customer identifiers), transaction amount 1014, and merchant identifiers 1016. The computer readable memories 1006 may also include various data to implement and maintain a rewards program for merchants, and produce analysis to offer merchants guarantees regarding the rewards to offer and the customers and customer profile types to target.

The rewards program system 102 may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the DCBR system 102 may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium may comprise a tangible storage medium. In some embodiments, the computer-readable medium may comprise a non-transitory medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for a promotion provider to manage a rewards program, the method comprising:
    receiving transaction data indicative of a transaction between a customer and a merchant;
    determining whether the customer is a registered customer by:
        extracting a first part of the transaction data, the first part of the transaction data indicative of a customer profile;
        searching a rewards database to identify unique rewards account information corresponding to the customer profile;
    determining whether the merchant is a registered merchant;
        extracting a second part of the transaction data, the second part of the transaction data indicative of a merchant profile;
        searching a merchant database to identify the merchant profile in the merchant database;
    determining whether the transaction data is indicative of a transaction between a registered customer and a registered merchant based on the determination that the customer is the registered customer and that the merchant is the registered merchant;
    determining whether the transaction data is indicative of a transaction between a non-registered customer and a registered merchant based on the determination that the customer is not registered and that the merchant is the registered merchant;
        in an instance in which the determination is made that the transaction involves a non-registered customer, determining whether a credit card number matches at least one previously used credit card in a rewards database, and in an instance in which the credit card number does match a previously stored credit card, indicating that that the system has previously reviewed transaction data associated with the credit card number and has previously created a credit card profile from the credit card number, storing the transaction data with the previously created credit card profile, and in an instance in which the credit card number does not match at least one previously used credit card number, creating a credit card profile utilizing the first part of the transaction data, the credit card profile identifying the first part of the transaction data;
        storing the second part of the transaction data and a third part of the transaction indicative of the transaction amount with the new credit card profile correlating the transaction amount and the merchant with the non-registered customer; and
        storing the first part of the transaction data and the third part of the transaction data in the merchant profile correlating the transaction amount and the non-registered customer, via the new credit card profile, with the merchant;
    determining whether the transaction data is indicative of a transaction between a registered customer and a non-registered merchant based on the determination that the customer is the registered customer and that the merchant is not the registered merchant;
        in an instance in which the determination is made that the transaction involves a registered customer and a non-registered merchant, utilizing the second part of the transaction data to create a new merchant account profile, the new merchant account profile identifying the second part of the transaction data indicative of the non-registered merchant; and
        storing the first part of the transaction data and the third part of the transaction with the new merchant account profile correlating the registered customer and the transaction amount with the non-registered merchant; and
        storing the second part of the transaction data and the third part of the transaction data in the customer account profile correlating the transaction amount and the non-registered merchant with the customer;
    determining whether the transaction data is indicative of a transaction between a non-registered customer and a non-registered merchant based on the determination that the customer is not the registered customer and that the merchant is not the registered merchant;
        in an instance in which the determination is made that the transaction involves the non-registered customer and the non-registered merchant, utilizing the first part of the transaction data to create a new customer account profile, the new account profile identifying the first part of the transaction data;
        utilizing the second part of the transaction data to create the new merchant account profile, the new merchant account profile identifying the second part of the transaction data indicative of the non-registered merchant;
        storing the second part of the transaction data and the third part of the transaction data with the new customer account profile correlating the transaction amount and the non-registered merchant with the non-registered customer;

storing the first part of the transaction data and the third part of the transaction data in the new merchant account profile correlating the transaction amount and the non-registered customer with the non-registered merchant;

determining, by a processor, whether the transaction data corresponds to unique rewards account information stored in a memory;

in an instance in which the transaction data does not correspond to unique rewards account information, receiving, via input at a point-of-sale device, a customer identifier; and in the instance of cash, associating the transaction data to the customer identifier and in the instance of a credit card, associating the transaction information with the credit card information and in an instance in which a credit card profile has been created, the credit card profile;

in response to determining that the transaction data corresponds to unique rewards account information stored in the memory, crediting a rewards account associated in the memory with the unique rewards account information; and in an instance in which no unique rewards account information is identified, utilizing previously generated multi-dimensional matrices, that identify probabilities that particularly categorized customer profiles or credit card profiles would accept a particular offer, to provide a discount offering.

2. The method of claim 1, wherein the unique rewards account information includes at least two types of information from the group comprising the credit card number, the customer identifier, a merchant identifier, and a promotion.

3. The method of claim 1, wherein the rewards account is a rewards account associated with the merchant.

4. The method of claim 1, further comprising issuing a promotion to the customer, wherein the promotion is based on an amount accrued in the rewards account.

5. The method of claim 1, further comprising:
determining whether the merchant is registered with the promotion provider,
wherein the rewards account is credited only if the merchant is registered with the promotion provider.

6. The method of claim 1, wherein the transaction data comprises a cash transaction amount and a customer identifier.

7. The method of claim 1, wherein the transaction data comprises a merchant identifier, credit card information, and a transaction amount.

8. The method of claim 7, further comprising:
determining whether the merchant is registered with the promotion provider,
wherein the rewards account is credited only if the merchant is registered with the promotion provider.

9. The method of claim 8,
wherein the transaction data further comprises a second transaction amount and a second merchant,
wherein the method further comprises:
determining whether the second merchant is registered with the promotion provider; and
in response to determining that the second merchant is registered with the promotion provider, crediting the customer rewards account based on the second transaction amount.

10. The method of claim 1, wherein the unique rewards account information comprises a credit card number, and wherein the transaction is authorized without involvement of the promotion provider.

11. The method of claim 1, further comprising:
identifying one or more promotions to offer to the customer based on the transaction data.

12. The method of claim 1, further comprising:
determining, when the transaction data indicates that the customer redeemed a promotion,
a probability that the customer will return to the merchant; and
a frequency with which the customer may return to the merchant.

13. An apparatus for a promotion provider to manage a rewards program, the apparatus comprising at least one processor and at least one memory including computer program code, the at least one memory and the computer program code configured to, with the at least one processor, cause the apparatus to:
receive transaction data indicative of a transaction between a customer and a merchant;
determining whether the customer is a registered customer by:
extracting a first part of the transaction data, the first part of the transaction data indicative of a customer profile;
searching a rewards database to identify unique rewards account information corresponding to the customer profile;
determining whether the merchant is a registered merchant;
extracting a second part of the transaction data, the second part of the transaction data indicative of a merchant profile;
searching a merchant database to identify the merchant profile in the merchant database;
determining whether the transaction data is indicative of a transaction between a registered customer and a registered merchant based on the determination that the customer is registered and that the merchant is the registered merchant;
determining whether the transaction data is indicative of a transaction between a non-registered customer and a registered merchant based on the determination that the customer is not the registered customer and that the merchant is the registered merchant;
in an instance in which the determination is made that the transaction involves a non-registered customer, determining whether a credit card number matches at least one previously used credit card in a rewards database, and in an instance which the credit card number does match a previously stored credit card, indicating that that the system has previously reviewed transaction data associated with the credit card number and has previously created a credit card profile from the credit card number, storing the transaction data with the previously created credit card profile, and in an instance in which the credit card number does not match at least one previously used credit card number, creating a credit card profile utilizing the first part of the transaction data, the credit card profile identifying the first part of the transaction data; and
storing the second part of the transaction data and a third part of the transaction indicative of the transaction amount with the new credit card profile correlating the transaction amount and the merchant with the non-registered customer; and storing the first part of the transaction data and the third part of the transaction data in the merchant profile correlating the transaction amount and the non-registered customer, via the new credit card profile, with the merchant;

determining whether the transaction data is indicative of a transaction between a registered customer and a non-registered merchant based on the determination that the customer is the registered customer and that the merchant is not the registered merchant;

in an instance in which the determination is made that the transaction involves a registered customer and a non-registered merchant, utilizing the second part of the transaction data to create a new merchant account profile, the new merchant account profile identifying the second part of the transaction data indicative of the non-registered merchant; and storing the first part of the transaction data and the third part of the transaction with the new merchant account profile correlating the registered customer and the transaction amount with the non-registered merchant; and storing the second part of the transaction data and the third part of the transaction data in the customer account profile correlating the transaction amount and the non-registered merchant with the customer;

determining whether the transaction data is indicative of a transaction between a non-registered customer and a non-registered merchant based on the determination that the customer is not the registered customer and that the merchant is not the registered merchant;

in an instance in which the determination is made that the transaction involves the non-registered customer and the non-registered merchant, utilizing the first part of the transaction data to create a new customer account profile, the new account profile identifying the first part of the transaction data;

utilizing the second part of the transaction data to create the new merchant account profile, the new merchant account profile identifying the second part of the transaction data indicative of the non-registered merchant;

storing the second part of the transaction data and the third part of the transaction data with the new customer account profile correlating the transaction amount and the non-registered merchant with the non-registered customer;

storing the first part of the transaction data and the third part of the transaction data in the new merchant account profile correlating the transaction amount and the non-registered customer with the non-registered merchant;

determine, by a processor, whether the transaction data corresponds to unique rewards account information stored in a memory;

in an instance in which the transaction data does not correspond to unique rewards account information, receiving, via input at a point-of-sale device, a customer identifier; and in the instance of cash, associating the transaction data to the customer identifier and in the instance of a credit card, associating the transaction information with the credit card information and in an instance in which a credit card profile has been created, the credit card profile;

in response to determining that the transaction data corresponds to unique rewards account information stored in the memory, credit a rewards account associated in the memory with the unique rewards account information; and in an instance in which no unique rewards account information is identified, utilizing previously generated multi-dimensional matrices, that identify probabilities that particularly categorized customer profiles or credit card profiles would accept a particular offer, to provide a discount offering.

14. The apparatus of claim 13, wherein the unique rewards account information includes at least two different types of information from the group comprising the credit card number, the customer identifier, a merchant identifier, and a promotion.

15. The apparatus of claim 13, wherein the rewards account is a rewards account associated with the merchant.

16. The apparatus of claim 13, wherein the at least one memory and the computer program code are further configured to, with the one processor, cause the apparatus to issue a promotion to the customer, wherein the promotion is based on an amount accrued in the rewards account.

17. The apparatus of claim 13, wherein the at least one memory and the computer program code are further configured to, with the one processor, cause the apparatus to:
determine whether the merchant is registered with the promotion provider,
wherein the rewards account is credited only if the merchant is registered with the promotion provider.

18. The apparatus of claim 13, wherein the transaction data comprises a cash transaction amount and a customer identifier.

19. The apparatus of claim 13, wherein the transaction data comprises a merchant identifier, credit card information, and a transaction amount.

20. The apparatus of claim 19, wherein the at least one memory and the computer program code are further configured to, with the one processor, cause the apparatus to:
determine whether the merchant is registered with the promotion provider,
wherein the rewards account is credited only if the merchant is registered with the promotion provider.

21. The apparatus of claim 20,
wherein the transaction data further comprises a second transaction amount and a second merchant, and
wherein the at least one memory and the computer program code are further configured to, with the one processor, cause the apparatus to:
determine whether the second merchant is registered with the promotion provider, and
in response to determining that the second merchant is registered with the promotion provider, credit the customer rewards account based on the second transaction amount.

22. The apparatus of claim 13, wherein the unique rewards account information comprises a credit card number, and wherein the transaction is authorized without involvement of the promotion provider.

23. The apparatus of claim 13, wherein the at least one memory and the computer program code are further configured to, with the one processor, cause the apparatus to:
identify one or more promotions to offer to the customer based on the transaction data.

24. The apparatus of claim 13, wherein the at least one memory and the computer program code are further configured to, with the one processor, cause the apparatus to:
determine, when the transaction data indicates that the customer redeemed a promotion, a probability that the customer will return to the merchant; and a frequency with which the customer may return to the merchant.

\* \* \* \* \*